Figure 1:
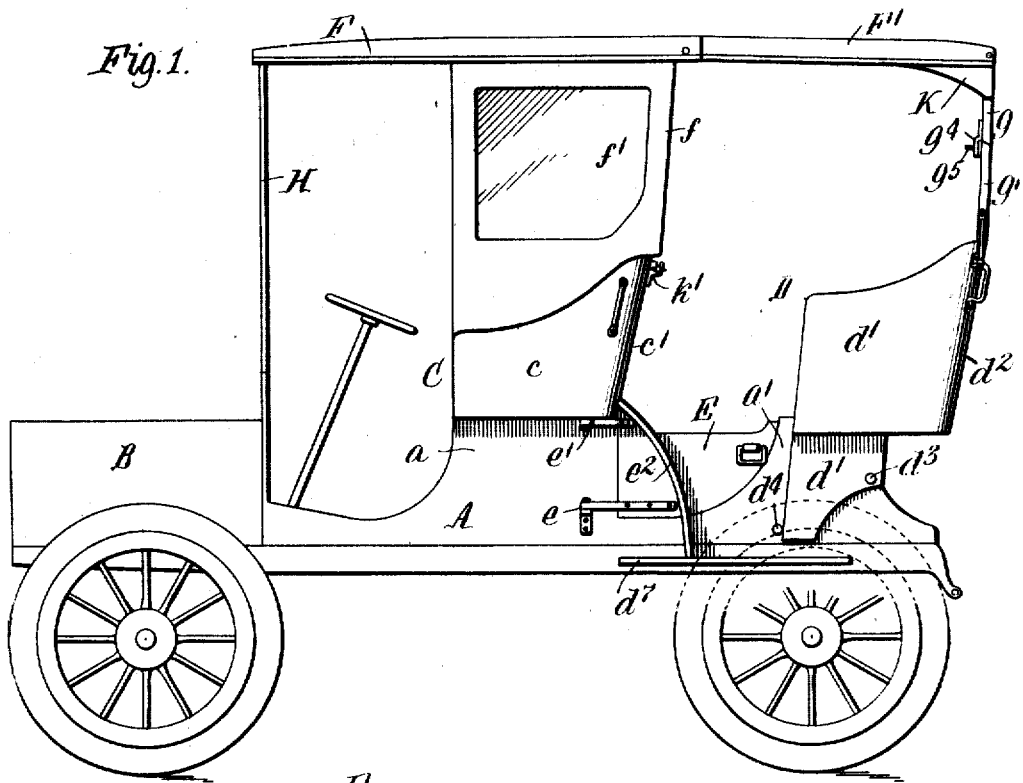

C. H. STRATTON.
CONVERTIBLE VEHICLE.
APPLICATION FILED OCT. 11, 1907.

921,177.

Patented May 11, 1909.
5 SHEETS—SHEET 1.

Witnesses:
E. A. Volk.
A. G. Dimond.

Inventor
Charles H. Stratton
By Wilhelm, Parker & Reid
Attorneys

C. H. STRATTON.
CONVERTIBLE VEHICLE.
APPLICATION FILED OCT. 11, 1907.
921,177.
Patented May 11, 1909.
5 SHEETS—SHEET 2.
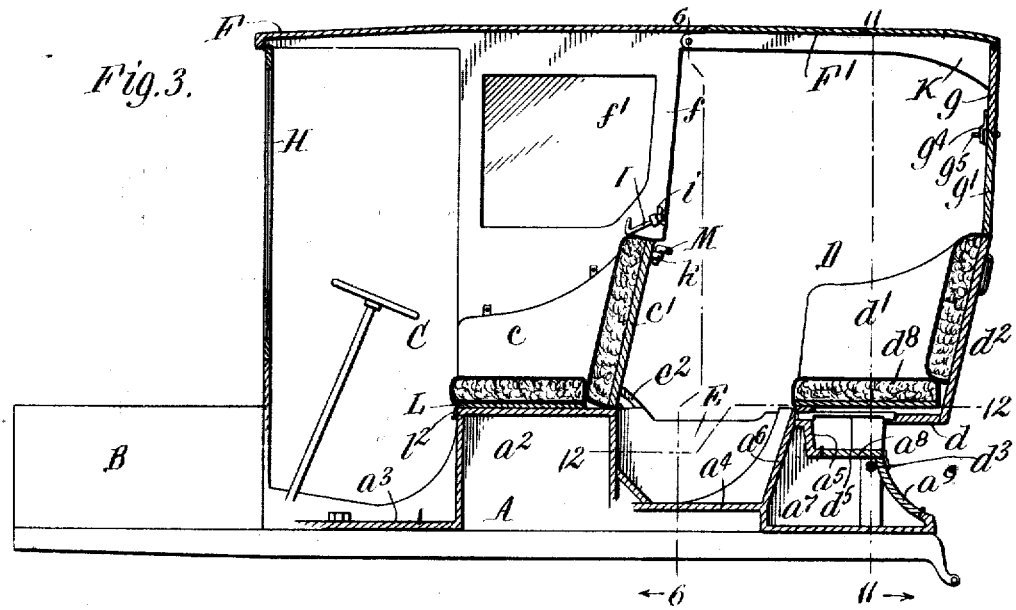
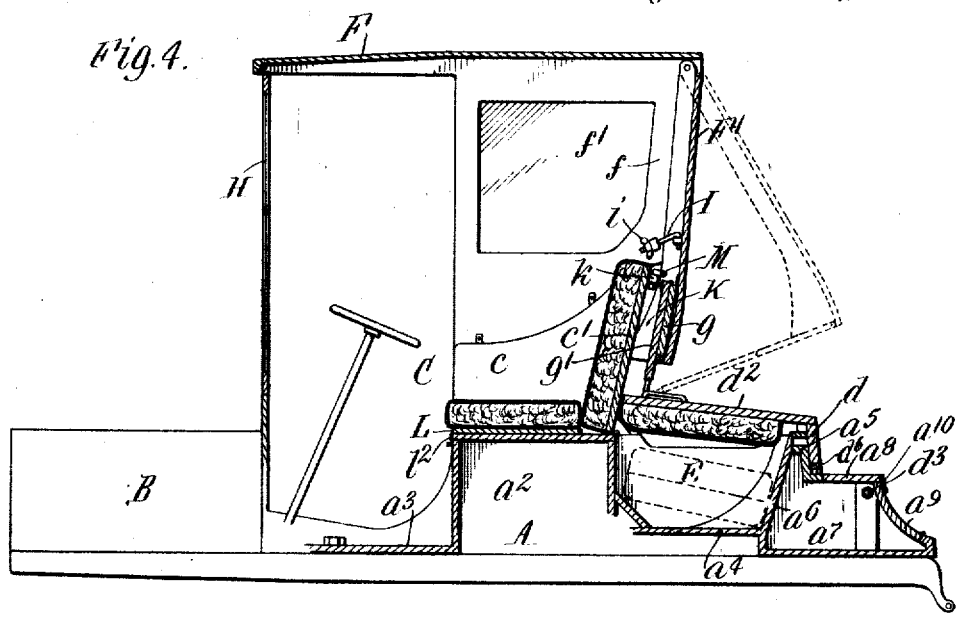
Witnesses:
E. A. Volk
A. G. Dimond
Inventor.
Charles H. Stratton
By Wilhelm, Parker & Hand,
Attorneys.

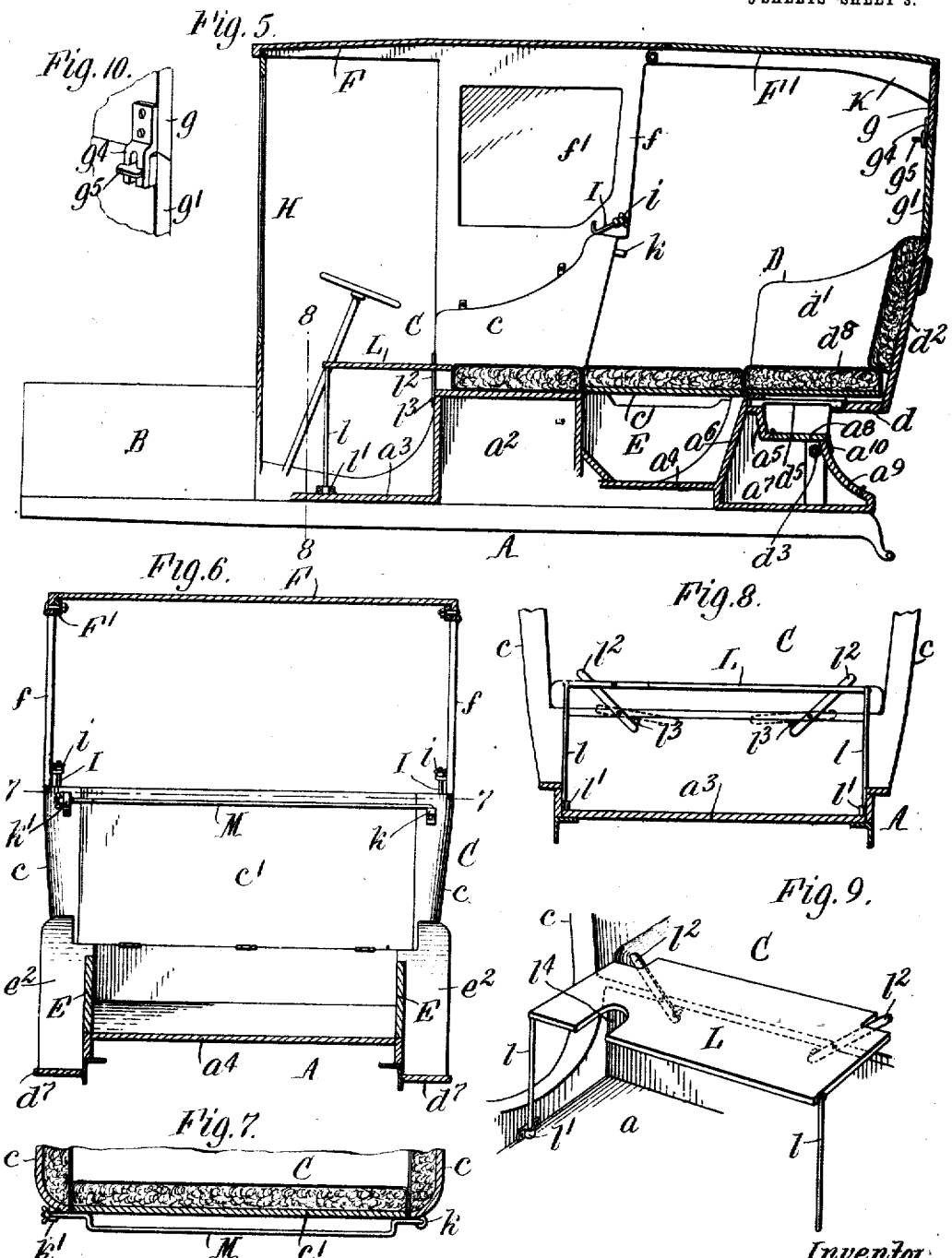

C. H. STRATTON.
CONVERTIBLE VEHICLE.
APPLICATION FILED OCT. 11, 1907.

921,177.

Patented May 11, 1909.
5 SHEETS—SHEET 4.

Witnesses:
E. A. Volk
A. G. Dimond

Inventor.
Charles H. Stratton
By Wilhelm, Parker & Hard,
Attorneys

C. H. STRATTON.
CONVERTIBLE VEHICLE.
APPLICATION FILED OCT. 11, 1907.
821,177.
Patented May 11, 1909.
5 SHEETS—SHEET 5.
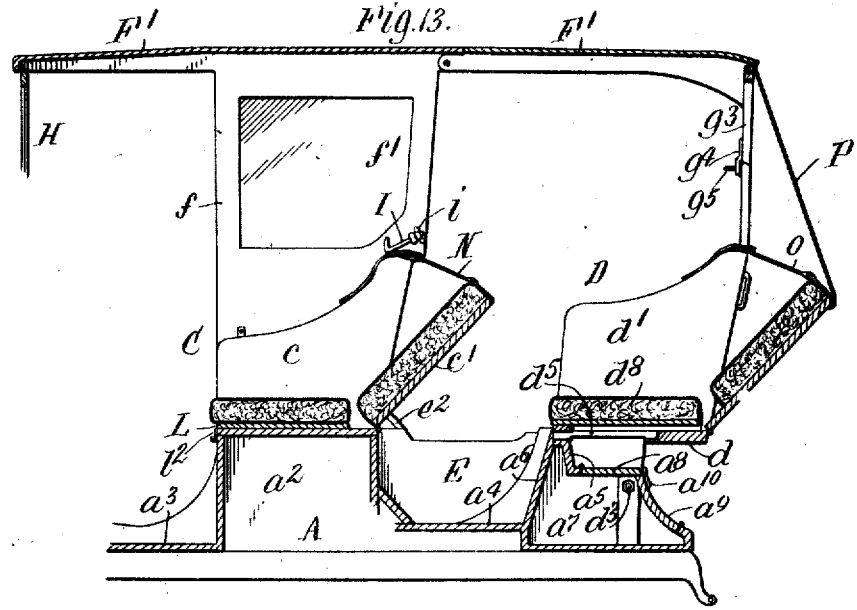
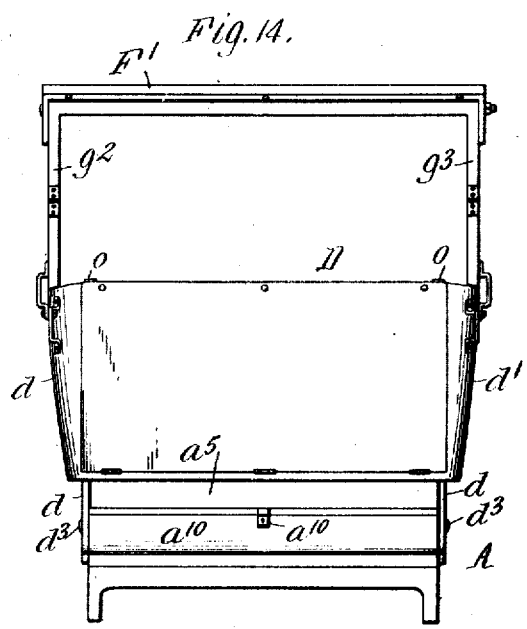
Witnesses:
E. A. Volk.
F. G. Dimond.
Inventor.
Charles H. Stratton
By Wilhelm, Parker & Hard,
Attorneys.

UNITED STATES PATENT OFFICE.

CHARLES H. STRATTON, OF MUNCIE, INDIANA.

CONVERTIBLE VEHICLE.

No. 921,177.　　　Specification of Letters Patent.　　　Patented May 11, 1909.

Application filed October 11, 1907. Serial No. 396,950.

*To all whom it may concern:*

Be it known that I, CHARLES H. STRATTON, a citizen of the United States, residing at Muncie, in the county of Delaware and State of Indiana, have invented a new and useful Improvement in Convertible Vehicles, of which the following is a specification.

This invention relates to convertible vehicles, and more particularly to a convertible construction for automobiles or motor vehicles.

The primary object of the invention is to produce a desirable vehicle of strong, stable and durable construction, and attractive appearance, which can be quickly and easily converted into either a one-seated vehicle capable of use as a covered or uncovered runabout and as a closed conveyance or coupé, or into a two-seated vehicle capable of use as a covered or uncovered touring car and limousine, and in which the seats are adjustable to enable the occupants to either recline or to lie full length, whereby the car can be used for sleeping purposes.

Other objects of the invention are to provide a covered vehicle with folding rear seat and top which are constructed and connected in such manner that the vehicle can be converted from a one to a two-seated vehicle, or vice versa, without disconnecting any of the parts, and so that the folding section of the top will form the back wall or closure for the one-seated vehicle; also to so construct and arrange the folding top section and back and connect them to the rear seat that they will serve to hold the rear seat securely in its lowered or folded position; also to provide the vehicle with side doors which can be opened to enable the occupants of the rear seat to enter and leave the vehicle, and so construct the rear seat that when folded down out of the operative position it will practically inclose and hide the doors; also to provide laterally-extending guards or wings on the doors and body which close the space between the sides of the rear seat and the body when the rear seat is folded down, to prevent the entrance of dust and dirt; also to hinge the back of the front seat so that it can be turned down to a horizontal position and bridge the space between the bottoms of the front and rear seats, thus forming with the latter a berth or extended uninterrupted surface upon which the occupants of the vehicle can repose, and to provide a foot board or rest with means for supporting it in the horizontal plane of the berth thus formed to give additional length thereto; also to improve the construction of convertible vehicles in the respects hereinafter described and set forth in the claims.

Figure 2:
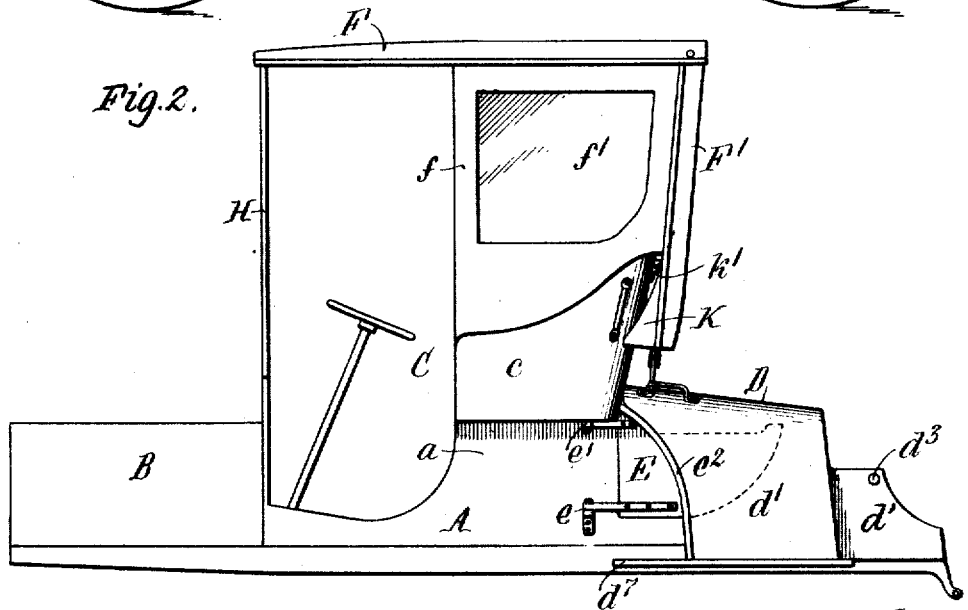
Figure 11:
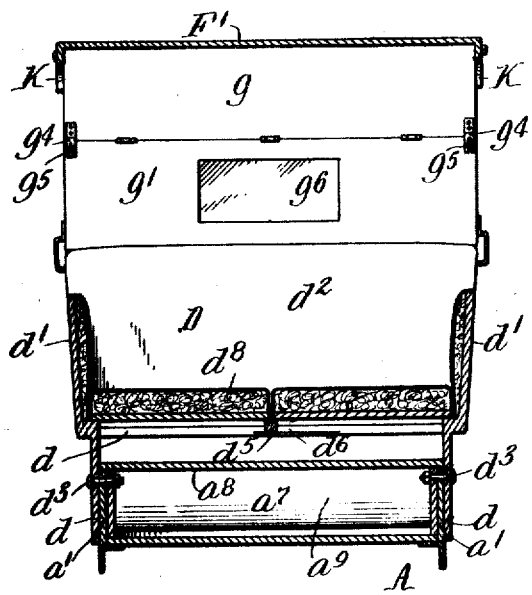
Figure 12:
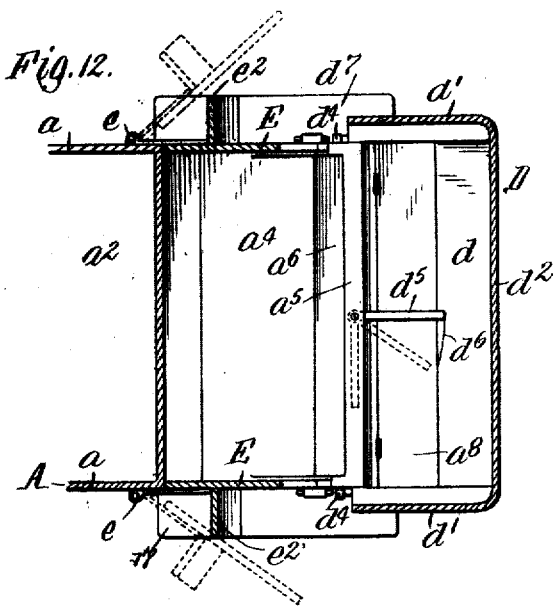

In the accompanying drawings, consisting of five sheets: Figure 1 is a side elevation of a convertible motor vehicle embodying the invention, showing the same ready for use as a two-seated covered touring car. Fig. 2 is a side elevation of the body of the same converted into a single-seated semi-closed vehicle. Fig. 3 is a longitudinal sectional elevation thereof when ready for use as a two-seated vehicle. Fig. 4 is a similar view thereof converted into a single seated vehicle. Fig. 5 is a sectional elevation thereof, similar to Fig. 3, but showing the back of the front seat swung down and the foot rest in position to form the berth. Fig. 6 is a transverse sectional elevation thereof, in line 6—6, Fig. 3. Fig. 7 is a sectional plan of the front seat, in line 7—7, Fig. 6. Fig. 8 is a transverse sectional elevation in line 8—8, Fig. 5, showing the foot rest in position for use. Fig. 9 is a perspective view of the foot rest and its supporting means. Fig. 10 is a perspective view of one of the shackles for securing the sections of the folding back. Fig. 11 is a transverse sectional elevation of the vehicle in line 11—11, Fig. 3, looking to the rear. Fig. 12 is a sectional plan of the rear portion of the body and rear seat, in line 12—12, Fig. 3. Fig. 13 is a longitudinal sectional elevation, similar to Fig. 5, of a body of modified construction, showing the backs of the front and rear seats adjusted to form reclining seats. Fig. 14 is a rear elevation of the body shown in Fig. 13, the rear seat back being in its upright or closed position.

Like letters of reference refer to like parts in the several figures.

$A$ represents the sides of the box or body proper of the vehicle. In the construction shown, these sides are provided between their ends with upwardly-extending portions or panels $a$ and at their rear ends with upwardly-extending portions or panels $a'$. The intermediate side panels $a$ are connected by a seat box $a^2$ which constitutes the bottom for the front seat of the vehicle and serves to inclose parts of the motive machinery (not shown), as usual, and the sides $A$ are connected in front and in rear of the seat box $a^2$ by floor or bottom portions $a^3$ $a^4$. The upper portions of the rear panels $a'$ are connected by a cross frame-piece or bar $a^5$ and in rear thereof by deck boards or panels which, with a transverse substantially upright board $a^6$, form a box or receptacle $a^7$ for tools or other articles. Two panels $a^8 a^9$ of the deck are hinged, in any suitable manner, the former at its front edge and the latter at its rear or lower edge and form doors for the tool box. The free ends of these doors, which meet when closed, can be secured by any suitable lock $a^{10}$.

B represents an ordinary hood or casing at the front end of the body for inclosing a portion of the motive machinery. The body with the exception of its rear portion, which is preferably constructed as described, may be of any usual or suitable construction.

C represents the front seat, which preferably consists of the bottom formed by the seat box $a^2$, and sides $c$ and a back $c'$ rising from said box. The back is preferably arranged between the sides and hinged at its lower edge to the rear edge of the bottom in any suitable manner so that it can be swung backwardly and downwardly and secured in different positions. The seat is wider than the seat box $a^2$, or projects outwardly over the side panels $a$, as usual, to give more seat room for the occupants.

D represents the rear seat, which comprises a bottom $d$, opposite sides $d'$ and a back $d^2$ secured to the side and rear edges of the bottom. The sides of the rear seat straddle the tool box or receptacle $a^7$ at the rear end of the body, and their upper portions are offset or extend outwardly beyond their lower portions to give the seat greater width than the box or body, as usual. The lower portions of the sides of the rear seat closely embrace the rear portion of the body or box $a^7$ and are pivoted thereto in any suitable manner, for instance, by horizontal bolts $d^3$, Figs. 1, 3 and 11, so that the rear seat can be folded or swung forwardly and downwardly on said pivots from the upright or operative position, shown in Figs. 1 and 3, into the closed or inoperative position, shown in Figs. 2 and 4. The rear seat is prevented from swinging rearwardly beyond the upright operative position by the front edges of the lower portions of its sides bearing against suitable stops $d^4$, Fig. 1, projecting laterally from the sides of the body. It can be locked in the upright position and held from swinging forwardly by any suitable means, such, for instance, as a latch $d^5$, Figs. 3 and 12, pivoted in a pocket in the cross bar $a^5$ of the frame and adapted to swing horizontally rearward so that its free end will engage in a recess $d^6$ in the front edge of the bottom board of the seat, as shown in Fig. 12. When it is desired to close or fold the rear seat downwardly, the latch is swung forwardly into the pocket in the cross bar $a^5$ of the frame. When the rear set is turned down the front edges of its sides rest upon horizontal foot boards $d^7$, Figs. 1, 2 and 12, which project outwardly from the rear portions of the sides of the body, and its bottom board $d$ bears against the upright rear face of the frame cross-bar $a^5$. The underface of the bottom board and the back of the rear seat then form portions of the deck or rear portion of the box or body, and the lower portions of the sides of the seat, which conform in shape to the rear side panels $a'$ inclose and hide these panels. The rear seat is strongly built and when it is turned down it incloses the rear portion of the body in a box-like structure which adds to the stiffness and rigidity of the body, tending to resist lateral twisting or racking strains thereon.

The bottom, sides and backs of the front and rear seats are cushioned or upholstered as usual, the bottom cushions of both seats being preferably loose or detached, and that, $d^8$, of the rear seat consisting of two hinged sections, see Fig. 11, so that it can be folded and stowed in the body under the rear seat, as indicated by broken lines in Fig. 4, when the rear seat is folded down.

The body of the vehicle is provided with side doors E between the front and rear seats to enable the occupants of the rear seat to get into and out of the vehicle. The doors are hinged at their front edges to swing outwardly, for instance, by lower and upper hinges $e$ $e'$ connected respectively to the intermediate side panels $a$ and to the overhanging portion of the front seat, see Figs. 1 and 2. The doors are provided with outwardly extending dust guards or wings $e^2$ which conform in shape to the upper edges of the sides of the rear seat and extend downwardly to meet the foot boards $d^7$ when the doors are closed. The rear seat is wide enough so that when it is folded down its sides will partially inclose and hide the doors, and the upper and front edges of the sides of the seat will rest against or close to the door wings $e^2$ and foot boards $d^7$, respectively, so that these parts will effectually close the spaces between the sides of the rear seat and the body and thus prevent the entrance of dust and dirt into the closed seat.

The top or cover of the vehicle consists of a stationary front section F and a folding rear section F' which is hinged at its front edge, in any suitable manner, to the rear edge of the front section. The front top-section is carried by side supports $f$ which, in the construction shown, consists of solid side walls or panels which are bolted or otherwise detachably secured to the sides of the front seat and are provided with side windows $f'$. The folding top-section F' is hinged at its rear end to the upper end of and is supported by a folding back which is hinged at its lower edge to the upper portion of the back of the rear seat, and consists of two sections $g\ g'$ hinged to each other. Any suitable hinge connections for joining the sections together and to the top and rear seat can be used. The back sections are rigid and are provided with suitable shackles or fastenings for holding their hinge joint rigid so as to form a rigid support for the rear end of the folding top section $F'$, but they can consist of solid wooden panels, as shown in Figs. 1-5 and 11, or of open frames or posts $g^2\ g^3$, as shown in Figs. 13 and 14, in which latter case a curtain could be used for the back inclosure or wall of the vehicle. The shackles shown (see Figs. 1, 10 and 11) for holding the back sections rigid consist of slotted irons $g^4$ fixed to the sides of the upper back section and adapted to interlock with turn-buttons $g^5$ on the adjacent portions of the lower section. If solid back panels are used, a window $g^6$ is preferably provided in the lower one, see Fig. 11. When the rear seat is folded down or closed, the rear section of the top will swing downwardly and the back $g\ g'$ forwardly to the position indicated by broken lines in Fig. 4. The parts can be left in this position if desired, which will afford side openings in rear of the side walls $f$, or the shackles $g^4\ g^5$ can be released, which will permit the folding section $F'$ of the top to swing forwardly against the back of the front seat and the two back sections $g\ g'$ to fold upon each other upwardly between the top section and the back of the front seat, as shown in Figs. 2 and 4. The folding top section $F'$ then constitutes a back wall or closure and a one-seated semi-closed or hooded vehicle is provided which can be completely closed in to form a coupé if desired, by providing the usual hinged front glass panel or window H and closing the side openings in front of the front seat by ordinary side curtains, or doors. When the rear seat, top and back are thus folded, the hinges joining the two back sections $g\ g'$ will lie approximately in a straight line connecting the hinges which join the folding top section to the stationary top section and the lower back section $g'$ to the rear seat, and the parts will therefore lock the rear seat in the closed position, or prevent it from raising until the top section $F'$ is first swung rearwardly to straighten out the folding back $g\ g'$. The top and back constructed and connected to the pivoted or folding rear seat as described, whereby they can fold with the seat and close the back of the one-seated vehicle without disconnecting any of the parts, could be used with a pivoted rear seat regardless of the construction of the same and the body and the particular manner of pivoting the seat.

I, Figs. 3 and 4, represents bolts swiveled to the side walls $f$ and having hooks to engage in eyes on the folding top section $F'$, and thumb nuts $i$ for drawing the top section tightly up against the rear edges of the side walls $f$. When thus secured, the folding top section not only cannot rattle, but it forms a tight back closure and serves to brace and strengthen the side walls. Any other suitable fastening means for this purpose could be employed. The folding top section $F'$ is preferably provided with depending side flanges or pieces K which embrace the side walls $f$ when the top section is folded, and the rear portions of these flanges are widened and shaped to practically inclose and hide the folded back $g\ g'$, as shown in Fig. 2, thereby adding to the attractive appearance of the vehicle.

When the rear seat is thrown up for use, a two-seated covered touring car is provided, and by closing the front window H and applying ordinary rear side curtains or doors a closed vehicle or limousine is provided.

The sides $f$ and back $g\ g'$ together with the top supported thereby can be detached, when the vehicle can be used either as a runabout or two-seated touring car.

The back $c'$ of the front seat, as before stated, is hinged to the rear corner of the seat box, and it can be swung downwardly and rearwardly to a horizontal position so as to rest upon the top edges of the rear side panels $a'$ of the body, as shown in Fig. 5. The back is of sufficient height to span the space between the front and rear seats when turned down, and its cushion is of proper size and shape to form with the cushions of the front and rear seats a continuous or uninterrupted cushioned berth or bed surface upon which the occupants of the vehicle can repose or sleep.

L represents a foot board or rest, which is ordinarily stowed beneath the front seat cushion, as shown in Fig. 3, but which can be pulled out and supported in the horizontal plane of the top of the seat cushions as a rest for the feet. As shown in Figs. 5, 8 and 9, the foot rest is supported in position for use by front legs $l$ pivoted to its side portions and adapted to be turned down vertically and engaged in suitable sockets $l'$ provided therefor in the bottom of the vehicle, and rear legs or supports $l^2$ which are pivoted to the front seat. When in use, these rear supports are held in the inclined position shown in Figs. 8 and 9, by the engagement of their lower ends against stop pins $l^3$, and the notched rear end of the foot board rests upon their upper ends. When not in use, the rear supports $l^2$ are turned inwardly into a horizontal position, as shown by dotted lines in Fig. 8, where they will be out of the way. The foot rest could be supported in operative position in various other ways. The foot rest is slotted at $l^4$ in its front portion to straddle the steering post when in use.

The back of the front seat can be secured in upright position by any suitable means, but a fastening bar M, Figs. 6 and 7, is preferably employed for this purpose. One end of this bar is hooked and engages in an eye $k$ on the rear part of one side of the front seat, and the other end rests in a slotted keeper $k'$ on the rear part of the other side of the seat and is threaded and provided with a thumb nut whereby the two sides of the seat can be drawn in against the ends of the back to hold the back firmly and stiffen the seat as a whole. The fastening bar is bent away from the seat back between its ends and serves as a coat rack. Straps N or other adjustable fastening devices are also preferably provided whereby the back of the front seat can be held in an inclined position to provide a reclining seat, as shown in Fig. 13. This figure also shows the back of the rear seat hinged and provided with similar straps O for securing it, too, in an inclined position. When the reclining rear seat is used, any ordinary or suitable back curtain or closure P, shown in Fig. 13, can be provided to protect the occupants.

I claim as my invention:

1. In a convertible vehicle, the combination of a body, a front seat, a shiftable rear seat which is movable into and out of operative position, a top having a folding rear section, and a back support for said folding top section connected to the same and to said rear seat to move with the latter and adapted to fold between said top section and the back of said front seat, said support forming a back closure for said rear seat when the latter is in its operative position, and said folding top section being of sufficient length to form a back closure for said front seat when folded down, substantially as set forth.

2. In a convertible vehicle, the combination of a body, a front seat, a shiftable rear seat which is movable into and out of operative position, a top having a folding rear section, and a folding back support for said folding top section hinged thereto and to said rear seat, whereby said folding top section is swung downwardly by shifting said rear seat and said folding support is adapted to fold between said folding top section and said front seat, substantially as set forth.

3. In a convertible vehicle, the combination of a seat pivoted to fold forwardly and downwardly, a top having a folding rear section, and a back support for said folding top section hinged thereto and to said seat and comprising sections hinged to fold upwardly in front of said folding top section, substantially as set forth.

4. In a convertible vehicle, the combination of a seat pivoted to fold forwardly and downwardly, a top having a folding rear section, a back support for said folding top section hinged thereto and to said seat and comprising sections hinged to fold upwardly in front of said folding top section, and means for holding said folding back support rigid in supporting position, substantially as set forth.

5. In a convertible vehicle, the combination of a front seat, a rear seat arranged to fold forwardly, a top having a folding rear section hinged to swing downwardly, and a folding back hinged to said folding top section and to said rear seat and comprising sections hinged to fold upwardly whereby said folding top section can be folded downwardly to form a back closure for said front seat with said folding back between the same and said front seat, substantially as set forth.

6. In a convertible vehicle, the combination of a front seat, a rear seat arranged to fold forwardly, a top having a folding rear section hinged to swing downwardly, and a back support for said folding top section connected thereto and to said rear seat and forming a back closure for said rear seat, said support being constructed to fold between said folding top section and said front seat and to allow said section to hang close to said seat, and means for securing said folding top section in its folded position, substantially as set forth.

7. In a convertible vehicle, the combination of a body, a shifting seat pivoted to said body to fold downwardly, said seat being of greater width than said body and having sides which straddle the sides of said body and are separated therefrom by intervening spaces when the seat is folded, and dust guards and foot boards which project laterally from said body and coöperate to close the spaces between said body and the sides of said seat when the latter is in its folded position, said foot boards forming steps when the seat is in its operative position, substantially as set forth.

8. In a convertible vehicle, the combination of a body having movable side doors, a shifting seat pivoted to said body to fold downwardly and having sides which straddle said doors when the seat is folded, and dust guards which project laterally from said doors and partially close the spaces between the sides of said seat and said body when said seat is folded, said doors with said guards being adapted to be moved forwardly to permit access to said seat when the latter is in its operative position, substantially as set forth.

9. In a convertible vehicle, the combination of a body having hinged side doors, a shifting seat pivoted to said body to fold downwardly and having sides which straddle said doors when the seat is folded, dust guards which project laterally from said doors and partially close the spaces between the sides of said seat and said body, and foot boards which project from said body and close the lower portions of the spaces between the sides of said seat and said body, said doors with said guards being adapted to swing forwardly to permit access to said seat when the latter is in its operative position and said foot boards forming steps therefor, substantially as set forth.

10. In a convertible vehicle, the combination of a body having hinged side doors, foot boards which project from said body, dust guards which project laterally from said doors and extend approximately to said foot boards, and a seat which is pivoted to the body in rear of said doors to fold forwardly and downwardly and has sides adapted when the seat is folded to straddle said doors and rest against or close to said foot boards and guards, said doors with said guards being adapted to swing forwardly to permit access to said seat when the latter is in its operative position and said foot boards forming steps therefor, substantially as set forth.

11. In a convertible vehicle, the combination of a seat having sides, and a hinged back between said sides, and a tie rod connecting the sides of said seat to hold them firmly against said back, said tie rod having a portion between its ends which is spaced from said back to form a coat rack, substantially as set forth.

12. In a convertible vehicle, the combination of a body having a rear deck with a substantially upright upper portion, and a seat having sides straddling said deck and pivoted to said body, and a bottom connecting said sides, said seat being adapted to swing forwardly and downwardly with its bottom in substantially upright position against said upright portion of said deck, substantially as set forth.

Witness my hand, this 4th day of October, 1907.

CHARLES H. STRATTON.

Witnesses:
NELLIE P. MITCHELL,
W. L. LYONS.